United States Patent [19]
Edwards

[11] Patent Number: 5,953,855
[45] Date of Patent: Sep. 21, 1999

[54] BIODEGRADABLE PESTICIDE DELIVERY SYSTEM

[76] Inventor: Allen W. Edwards, 10281 Wales Loop, Bonita Springs, Fla. 34135

[21] Appl. No.: 09/013,212

[22] Filed: Jan. 26, 1998

[51] Int. Cl.⁶ .................................................. A01M 1/00
[52] U.S. Cl. ............................................................ 43/132.1
[58] Field of Search ................................... 43/132.1, 124, 43/131, 133

[56] References Cited

U.S. PATENT DOCUMENTS

| | | | |
|---|---|---|---|
| 984,352 | 2/1911 | Costello | 43/124 |
| 5,329,726 | 7/1994 | Thorne et al. | 43/124 |
| 5,555,672 | 9/1996 | Thorne et al. | 43/124 |
| 5,564,222 | 10/1996 | Brody | 43/124 |

Primary Examiner—Thomas Price

[57] ABSTRACT

A biodegradable pesticide delivery system for administering pesticide materials to control or eliminate noxious insects such as termites. Consisting of a selectively, pressure treated sacrificial wood casing into which a plurality of either blind holes or through holes are bored laterally into the casing side wall to act as access holes for foraging insects to reach a pesticide material. The casing will have either a single, or multiple interior centrally located bored cavity which can be pre-filled, with a pesticide material, and thereafter the casing is installed in, or on the ground. Foraging wood destroying insects such as termites, attack the non pressure treated area's of the pesticide delivery system wood casing and penetrate into the interior single or multiple cavity through the non pressure treated lateral access holes, and feed on the pesticide material contained therein.

11 Claims, 4 Drawing Sheets

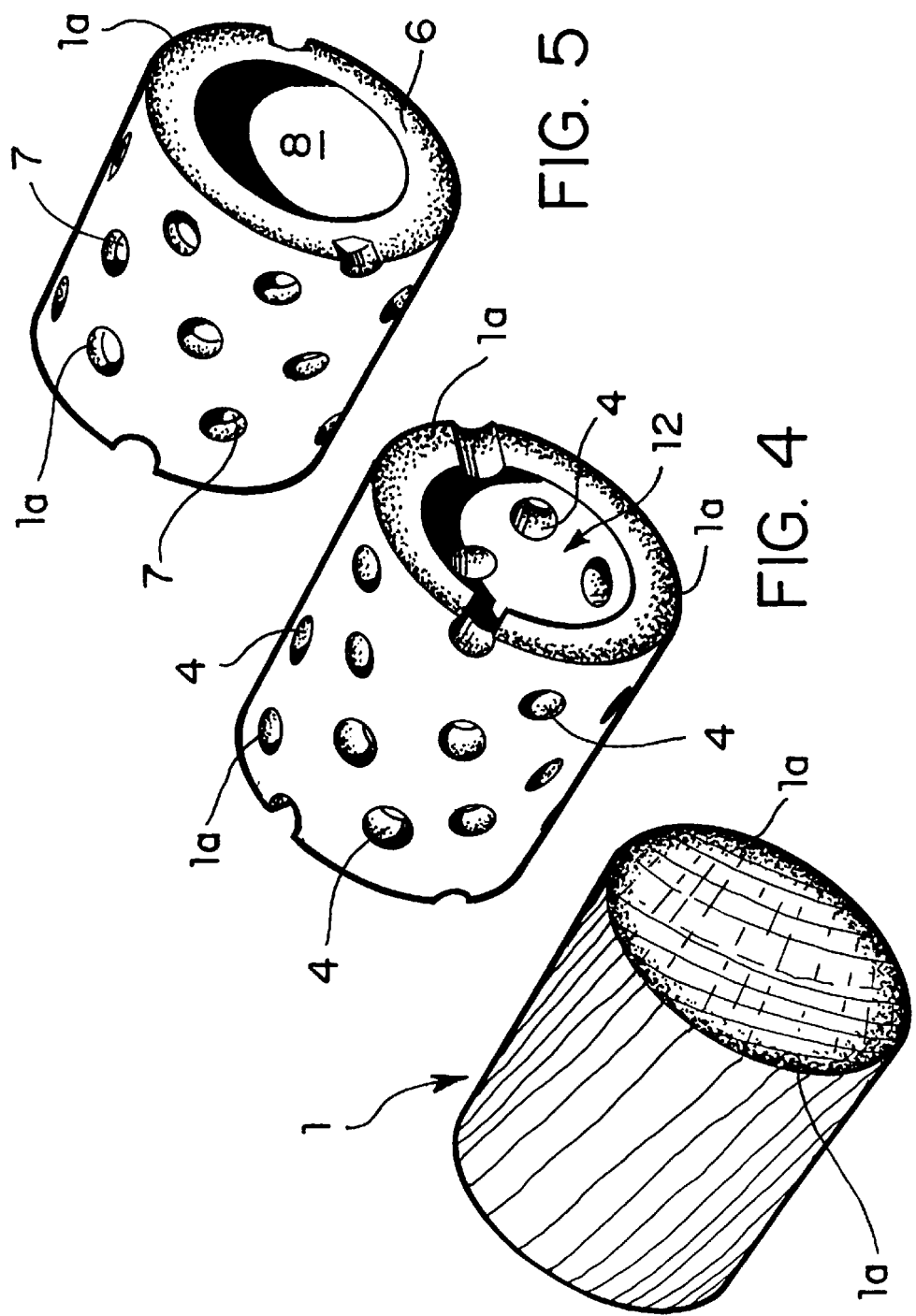

BIODEGRADABLE PESTICIDE DELIVERY SYSTEM

FIELD OF THE INVENTION

The present invention generally relates to a simplified one step, single stage, biodegradable pesticide delivery system for administering pesticide materials to control and/or eliminate noxious insect infestations, and more particularly, this invention relates to a biodegradable pesticide delivery system that can be safely utilized by those who are not skilled in the art of controlling insect infestation.

The science of pesticide pathology is known to be highly complex, and utilize compounds and substances which can be of a toxic nature, to thereby requiring special handling.

Due to these circumstances, numerous procedures have been developed by those skilled in the art, which call for highly specialized programs of a complicated nature, which can only be performed by technicians who have received a high degree of training.

Although procedures of the current art are reasonably effective, the capital cost of performing the services is extremely high due to labor intensive procedures by highly qualified personnel.

Therefore a system is needed that will not only utilize the advantages of current technology in the art, but will simplify the application of this technology, and bring it within reach of those not skilled in the art, so that they may safely implement the system efficiently, without extensive training, and at a reasonable cost. The pesticide delivery system of this invention fulfills these parameters.

BACKGROUND OF THE INVENTION

It is a well known fact that wood destroying insects and organisms such as for example, subterranean termites, are responsible for the destruction of vast quantities of wood used in construction, resulting in huge financial losses. It is estimated that subterranean termite damage alone approaches a billion dollars annually in the United States.

Typically, wood destroying insects such as subterranean termites, are prevalent over a wide range of climatic conditions, and are found to be active in both Northern and Southern regions.

Current conventional procedures for the treatment and control of these species, and similar noxious insects is extremely difficult to apply, and equally expensive to maintain after the application. Also the eradication of for example, a colony of subterranean termites, will not ensure there will be no emergence of a new colony at a later date.

It is therefore necessary to commit to an ongoing preventative maintenance program once the incumbent colony has been eliminated.

Furthermore, pesticide control procedures of the current art are generally performed by highly skilled personnel, due to the complex nature of the systems used. This increases the overall cost substantially to the user of such services.

It is also a fact that due to the nature of the pesticide materials used to treat noxious insect infestation, and the complex manner in which they are applied, the general public are not permitted to buy most of these pesticide materials for their own use.

Treatment for noxious insect infestation involve numerous procedures, such as the application of toxic, soil pesticides, either by spraying, or drilling holes into either the ground, or even the structure to be protected itself, and then injecting pesticides.

Another system utilized is the digging of trenches and the installation of physical insect barriers around the perimeter of the structure to be protected, in combination with the use of pesticides.

Yet a further system is the installation of underground sensing stations, which are periodically monitored, and subsequently charged with pesticides either in bait or poison form, when insects are observed inside the monitored stations.

In addition, some systems require the installation of a network of perforated underground tubing, through which a liquid pesticide is sprayed.

It is obvious that such procedures must be performed by highly trained technicians, and result in extremely expensive application and installation costs.

In addition, due to the complexity of these systems, they are not for sale to the general public, as it is reasonable to believe that the general publics lack of expertise in the art would result in substandard applications, with less than optimal results, and the possibility of environmental damage.

The costs of these current conventional systems as discussed above, is further increased by their ongoing maintenance procedures.

Additional re-treatment of pesticides have to be applied on a periodic, or possibly annual basis, and a continuing maintenance program is necessary to monitor the results, due to the nature of the systems.

Furthermore, such maintenance procedures are usually only carried out by highly trained technicians, and at a correspondingly high cost.

It is readily apparent that there is the need for a simplified system of controlling noxious insects, which should be within the capability of those not skilled in the art, to successfully implement, and maintain.

Also, due to the rapid deployment of noxious insects such as subterranean termites, it is advantageous to do a preemptive preventative pesticide installation before termites and other noxious insects gain a foothold. This can be accomplished by the installation of the pesticide delivery system of this invention.

DESCRIPTION OF THE PRIOR ART

Prior U.S. Pat. No. 5,329,726, issued Jul. 19, 1994, discloses a SYSTEM FOR TERMITE DETECTION AND CONTROL, in which a perforated, and more or less permanent housing is deposited into the ground, and subjected to periodic inspections. Pesticides are placed into the housing upon indications of subterranean termite activity.

The prior patent cited and made a matter of record, has been studied, and also the following U.S. patents which relate to this field of endeavor.

U.S. Pat. No. 1,013,514: January 1912
U.S. Pat. No. 2,837,861: June 1958
U.S. Pat. No. 3,017,717: January 1962
U.S. Pat. No. 3,940,875: March 1976
U.S. Pat. No. 4,945,673: August 1990

While the above discussed and listed patents relate to this field of endeavor, they do not disclose the pesticide delivery system described in this invention.

OBJECTS OF THE INVENTION

It is a primary objective of this invention to provide a highly effective, but simple system of delivering and administering pesticides in such a manner so as to be within the ability of those unskilled in this art, to be able to safely, and efficiently install, and maintain a high level of protection from insect infestation, with a minimum of training, and at a low cost.

Yet another objective of this invention also relates to the safe and efficient single stage administering of pesticide material, in both a poison, or a bait form, in either granular, solid, or liquid state, in order to control noxious insects and wood destroying organisms.

Once the pesticide delivery system of this invention at hand is installed, no further participation, or monitoring procedures are required to be performed to the installed units.

An additional objective of this invention would be to make available a variety of ready to use preloaded pesticide delivery systems which have been preloaded by the pesticide manufacturers of pesticide materials such as for example, but not limited to, Dursban, or Hexaflumuron.

This would make available a wide variety of pesticide materials, according to regional requirements, the species of noxious insects to be controlled, and the choice of either a poison, or bait type pesticide material.

The preloading of the pesticide units of the pesticide delivery system, would ensure the safe handling of the pesticide materials.

This is so, because the user of the pesticide delivery system will have no actual physical contact with the preloaded pesticide materials, and will have no opportunity to either ingest, or inhale the chemicals contained therein, of which many are of a toxic nature.

Detailed instructions accompanying each pesticide delivery system, would allow those unskilled in this art, to safely, and successfully install pesticide delivery systems of this invention.

The installers participation is limited to performing a simple measuring procedure to ensure a nominal separation between the units or stations of the pesticide delivery system, and to thereafter drive the preloaded pesticide delivery system units into the ground, at measured intervals.

A further object of this invention is cost effectiveness. It can be readily seen that existing procedures under the present state of the art, require substantial funding, and indeed, once the procedures are implemented, homeowners would find themselves committed to a continuing financial undertaking in order to preserve the integrity of the system.

The pesticide delivery system resolves this problem. This is so, because the pesticide delivery system of the invention at hand, provides not only a highly efficient utility delivery system for the appropriate pesticides material, but a do it yourself "Use and forget" single stage system, at a low acquisition, and maintenance cost.

Yet another objective of the present invention is also to provide an environmentally friendly pesticide delivery system.

Current conventional art relies heavily on plastic components in the construction of their insect traps, monitoring stations, and/or bait containers.

The concept of using a biodegradable pesticide delivery system which is totally insect consumable, is contrary to the present conventions in the art, which teaches the use of non disposable monitoring or bait stations.

Another object of the present invention is to make exclusive use of biodegradable wood in the construction of the pesticide delivery system.

This will ensure an environmentally friendly container or unit, which will decompose safely at the end of its useful service life.

Yet another objective of this invention is to provide a simple ongoing maintenance program. This is achieved by the installation of supplementary units of the pesticide delivery system on an annual basis, or as required, in order to maintain the integrity and level of protection achieved after the primary installation of the system.

BRIEF DESCRIPTION OF THE DRAWINGS

FIG. 3 Is a cylindrical stock of wood after pressure treating.

FIG. 4 Illustrates a view of a cylindrical casing after machining.

FIG. 5 Shows a view of a cylindrical casing after a different machining.

DETAILED DESCRIPTION OF THE DRAWINGS

Figure 1:
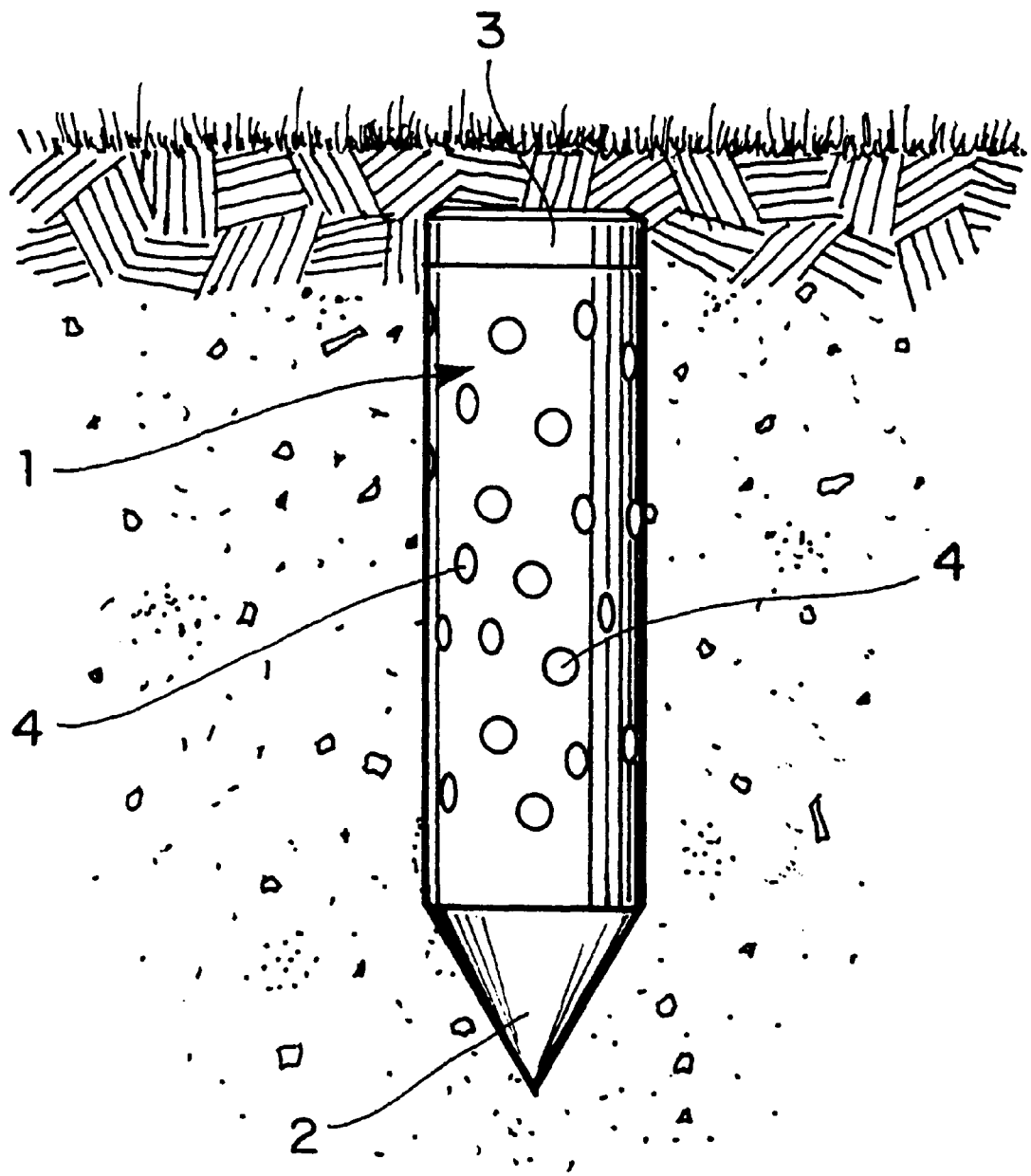
FIG. 1 Illustrates a unit of the invention installed in an underground environment.

The unit 1 of FIG. 1 represents a casing or container 1 as part of the pesticide delivery system. The casing 1 consists of wood such as a soft type of wood, such as pine. The wood is biodegradable and will decompose after some period of time.

The container 1 has a cone shaped bottom or end 2 which is shaped in a cone to aid in driving the same into the ground. The container 1 further has a top closure cap 3 which acts as an anvil when the container 1 is driven into the ground.

Furthermore, the container 1 has lateral holes 4 which may penetrate into the interior of the casing, or alternatively they may be blind holes as will be explained later below.

Figure 2:
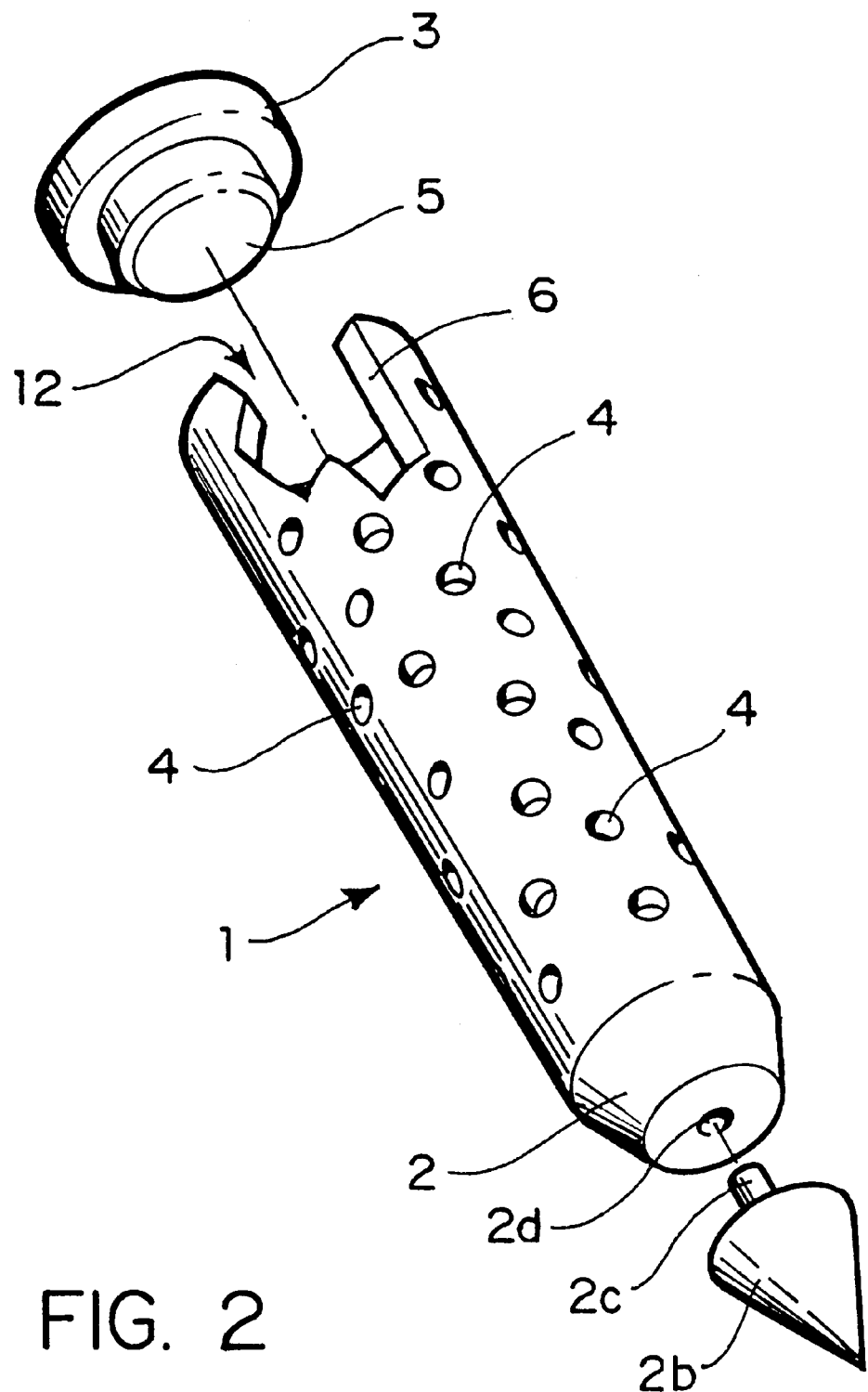
FIG. 2 Shows a unit of the invention in a perspective view.

FIG. 2 is an exploded and perspective view of the casing or container 1. The cone shaped tip 2 has been modified in that the outermost tip has been replaced by a steel or other metal tip 2b which is fastened to the wood tip 2 by means of a pin 2c which is received in a hole 2d.

Of course other fastening means may be used. The use of a metal tip aids in driving the casing into the ground to thereby preserve the integrity of the casing.

The casing or the container 1 has a parallel sided cylindrical construction as is seen in perspective in FIG. 2. The novel combination anvil and closure member 3 will abut the top 6 of the casing member and the closure has a reduction 5 of its diameter so that this reduction will snugly fit within the cavity of the casing.

The casing itself has a plurality of holes 4 bored into the same. The bores may be through bores 4 or may be blind bores 7 (FIG. 5) as will be explained later. The internal cavity designated by the numeral 12, terminates as a blind bore in the casing 1.

Turning now to FIG. 3, there is shown a section of the initial stock of the wood prior to being machined into a unit of the pesticide delivery system. The initial stock of the wood is preferred to be cylindrical, but other shapes such as square or rectangular may be used.

It is preferred that the stock of wood be cylindrical for ease of handling, and when driving the same into the ground.

Prior to being machined, the stock of wood will be chemically pressure treated by a commercial process such as Wolmanizing, to a depth of about 1 to $2/32$ of an inch.

This is to ensure an initial moisture protection and to deter an immediate attack by insects on the exterior of the casing and to render the same as a passive surface.

It is understood that in general, after an extended period of time, the chemicals used to pressure treat wood, deteriorate and eventually the treatment is rendered ineffective, resulting in the natural biodegradable process of decomposition, as the pressure treated wood ages.

As this aging process takes considerably longer than the useful service life of the pesticide delivery system, the integrity of the systems performance will not be compromised, while at the same time, the spent pesticide delivery system's casings will gradually become completely environmentally biodegradable as they decompose.

It is to be noted that in FIG. 3 and also in other Figs., the depth of penetration of the pressure treating process has been indicated by the shading 1a.

The importance of the controlled depth of penetration of the pressure treatment is obvious, as the barrier resulting from the pressure treatment is penetrated by machining operations, and untreated wood becomes exposed and vulnerable to attack by the insects as a sacrificial wood, to ensure the attacking insects continued presence.

Turning now to FIG. 4, there is shown a section of casing 1 after a round internal central cavity 12 has been bored into the same, to a depth of about ¾ of its length and with a diameter of about 1 ¼ inch, while the outer diameter of the casing is about 2 inches.

These measurements are preferred while obviously other measurements may be used. Thereafter, small diameter holes 4 are laterally bored into the casing, penetrating into the interior cavity 12. The holes in the casing side wall are bored in a random fashion and in such a manner that they are not symmetrically aligned.

The reason for this is to prevent further loss of the structural integrity of the casing and to be better able to withstand the impacts when the casing is driven into the ground.

The plurality of holes are located around the entire outer periphery of the casing, the purpose of this pattern is to provide three hundred and sixty degree's of potential entry holes to foraging target insects, once the pesticide delivery system is driven into the ground, so that the insects may have a maximum opportunity to access the pesticide.

Turning now to FIG. 5, there is shown a section of a somewhat different casing wherein the former through holes 4 have been replaced by lateral blind holes 7. in other words the blind holes 7 do not penetrate into the internal cavity 12 of the casing 1, to thereby leave a thin membrane 8, by not penetrating the integrity of the casing 1 inner surface.

The manner of arranging the holes around the periphery of the casing is the same as it was explained above with reference to FIG. 4.

Figure 6:
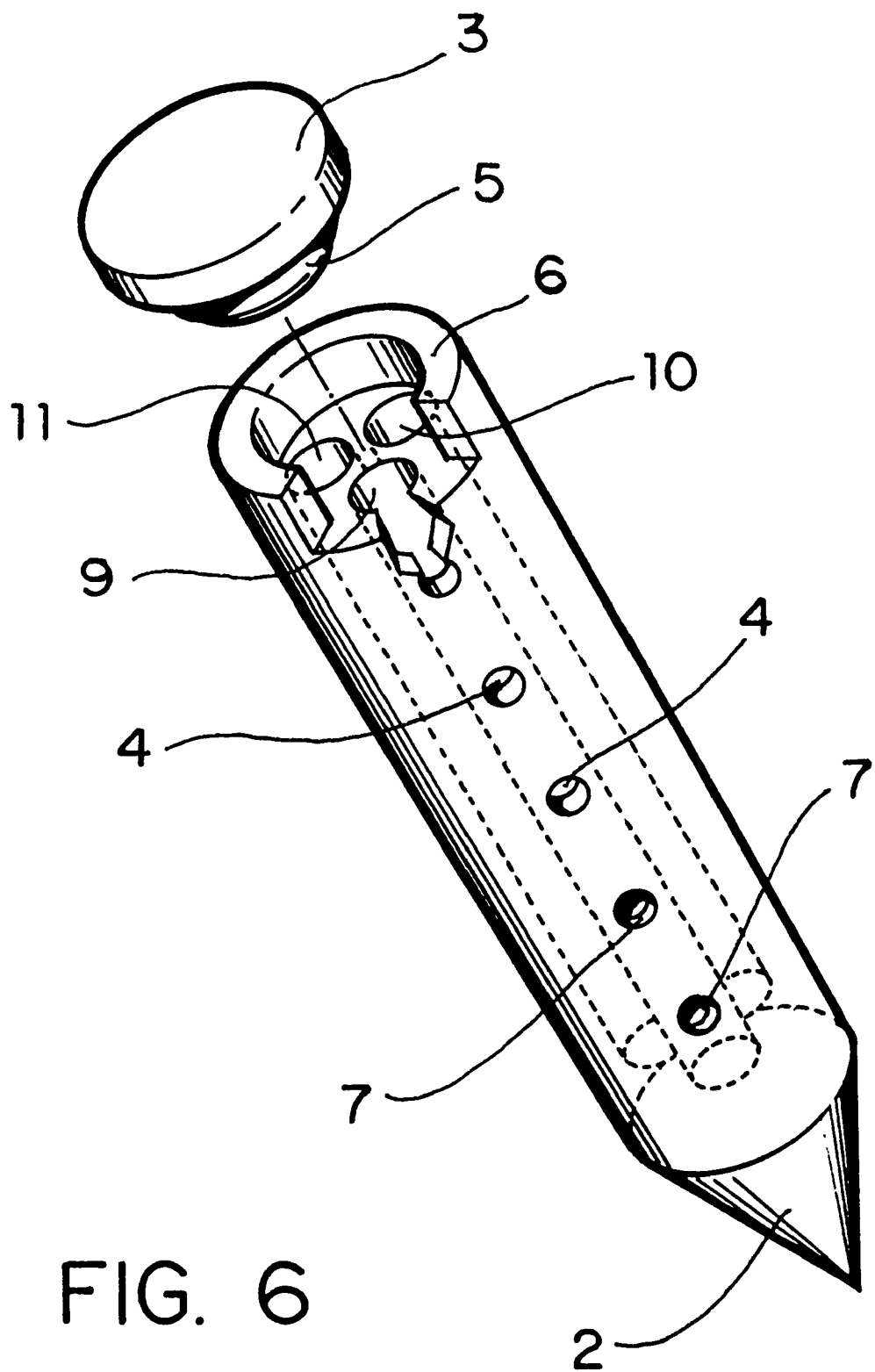
FIG. 6 Is a view of the casing having multiple cavities.

Finally referring to FIG. 6, there is shown another casing 1 having a plurality of internal bores 9, 10, and 11, instead of having a single bore. These plurality of cavities 9, 10, and 11, could be used for a combination of different pesticides simultaneously for maximum effect. All other aspects of this embodiment remain the same such as the use of through holes 4, or blind holes 7.

SUMMARY OF THE INVENTION

The long-standing but heretobefore unfulfilled need for a biodegradable pesticide delivery system for administering pesticides, in such a manner as to be easily utilized by those unskilled in the art, and available at a reasonable cost, is now fulfilled by the invention disclosed hereinafter and summarized as follows.

The pesticide delivery system consists of a perforated wooden casing that is fabricated out of pressure treated soft wood, such as pine, or other soft wood specie.

The present invention selects wood as a manufacturing material, as this represents the most desirable form of cellulosic food, or a material for the target insects, and is without question a termite attractive, edible bait material.

There can be no faster way to attract wood destroying insects than by using sacrificial wood. The presence of wood lures the target insects into a false sense of security, and establishes, and consolidates a desirable site for their attention.

By using this inventive concept, during the course of their activities, the noxious insects will be introduced to the pesticide material gradually, as they become increasingly aggressive at the site of the pesticide delivery system.

When foraging insects have discovered the pesticide delivery system, there should be no disruption whatsoever, so as not to disturb the foraging galleries which are formed as a part of the foraging target insects natural activity.

Any disturbance will inevitably delay the insects acceptance of the site, or may even result in the target insects abandoning the location all together to thereby forage somewhere else.

An inherent problem with systems of the present art is that many of them require a periodic inspection of the monitor or pesticide stations to verify the presence of target insects, thereby disturbing the insects and disrupting continuity.

The casings of the invention are placed around the perimeter of a structure to be protected, at certain intervals driven into the ground, or alternatively laid upon the surface.

It is obvious that foraging insects will enter the pesticide delivery system units, as they are lured into the plurality of bored holes in the casing side wall, to access the exposed, untreated wood, which is only about one thirty second of an inch inside the bored holes, beyond the outer exterior pressure treated surfaces of the casing .

Once the attacking insects are inside the bored holes, the exposed, and untreated wood surfaces will encourage their continued presence. Also there is no impediment to their forward travel towards the casing's internal cavity which contains the pesticide material.

Without any outside disruption of the attacking insect's feeding frenzy, they will progress unhindered to the pesticide material contained in the central cavity.

Thus, the exterior pressure treated surfaces of the wood casing will essentially be protected against attacking insects for an extended period of time.

As a result of this exterior pressure treatment of the wood casing, attacking insects are lured quickly into the interior cavity of the casing as they pursue their search for edible material, since they are not motivated to waste time on the remaining pressure treated exterior areas of the pesticide delivery system.

In the pesticide delivery system of FIG. 4, wherein the casing 1 has the numerous through bores 4, it may be necessary to prepackage granular or liquid pesticides inside a thin walled biodegradable termite edible cellulosic material cartridge, such as for example waxed paper.

This would allow safe handling of the pesticide charged casings of the pesticide delivery system, and avoid any loss of pesticide material through the casing side wall holes prior to installation in the ground. The pesticide cartridge, if one is required, would be of sufficient size as to fit snugly inside the internal cavity of the casing.

As to the casing, as explained with reference to FIG. 5, wherein blind holes have been bored in the casing wall, the pesticide material can be handled in quite a different manner.

The membrane 8 left in the interior wall of the cavity has numerous important functions, primarily it serves as a barrier between the end of the blind holes, and the interior cavity 12 of the casing.

The wood membrane will permit the use of pesticide materials inside the interior cavity of the casing, without the use of a auxiliary container for the pesticide material.

The wood membrane will prevent the escape of pesticide material from the interior cavity of the casing prior to installation.

The barrier which is formed as a result of the wood membrane also isolates the pesticide material from the user of the pesticide delivery system resulting in safe handling.

Furthermore, the wood membrane also minimizes the overall structural weakening of the casing which is caused as a result of the numerous bored lateral holes and the central cavity.

In addition, the total surface area of the wood membrane is non pressure treated wood. This is the direct result of the boring operations, which penetrate the one thirty second of an inch pressure treated barrier on the peripheral outside surfaces of the casing.

Consequently the accumulative total surface area of the exposed non pressure treated wood membrane is significant and necessary to attract the attention of the target insects.

Access to the pesticide material can only take place after the insects have penetrated the wood membrane at the end of the blind hole. The time taken to penetrate the wood membrane will allow the insects to become familiar with the site, and establish their foraging galleries.

It will thus be seen that the objects set forth above, and those made apparent from the foregoing description are effectively attained and since certain changes may be made in the above described construction without departing from the scope of the invention, It is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A biodegradable pesticide delivery system comprising of a means for administering pesticide material to noxious insects, consisting of multiple stations, each station consisting of a wooden biodegradable casing having a longitudinal interior central cavity, therein forming a casing wall and further having a multiple of lateral holes penetrating into said casing wall, said holes being placed around the entire periphery of said casing, and a pesticide material contained in said cavity.

2. The biodegradable pesticide delivery system of claim 1, wherein said holes are placed in an asymmetrical pattern.

3. The biodegradable pesticide delivery system of claim 1, wherein said holes penetrating into said wall extend into said interior cavity of said casing.

4. The biodegradable pesticide delivery system of claim 3, wherein an outer surface of said casing has been pressure treated to a predetermined depth.

5. The biodegradable pesticide delivery system of claim 1, wherein said holes penetrating into said wall are blind holes forming a membrane on an interior surface of said cavity.

6. The biodegradable pesticide delivery system of claim 4, wherein an outer surface of said casing has been pressure treated to a predetermined depth.

7. The biodegradable pesticide delivery system of claim 1, wherein an outer surface of said casing has been pressure treated to a predetermined depth.

8. The biodegradable pesticide delivery system of claim 1, wherein one end of said casing is closed by a pressure treated anvil like closure.

9. The biodegradable pesticide delivery system of claim 1, wherein the casing has a cone shaped end.

10. The biodegradable pesticide delivery system of claim 9, wherein part of said cone shaped end is metal.

11. The biodegradable pesticide delivery system of claim 1, wherein there is a multiple of longitudinal cavity's within said casing.

* * * * *